(12) United States Patent
Shpilyuck et al.

(10) Patent No.: US 12,386,612 B2
(45) Date of Patent: Aug. 12, 2025

(54) CLOUD PROXY-BASED SIDECAR COALESCENCE

(71) Applicant: Dell Products L.P., Round Rock, TX (US)

(72) Inventors: Boris Shpilyuck, Ashdod (IL); Igor Dubrovsky, Beer-Sheva (IL); Nisan Haimov, Beer-Sheva (IL)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 18/363,086

(22) Filed: Aug. 1, 2023

(65) Prior Publication Data
US 2025/0045046 A1 Feb. 6, 2025

(51) Int. Cl.
*G06F 8/71* (2018.01)
*G06F 8/72* (2018.01)

(52) U.S. Cl.
CPC . *G06F 8/71* (2013.01); *G06F 8/72* (2013.01)

(58) Field of Classification Search
CPC ...................................... G06F 8/72; G06F 8/71
See application file for complete search history.

(56) References Cited

U.S. PATENT DOCUMENTS

| 10,146,530 B1 * | 12/2018 | Rajput | G06F 8/71 |
| 11,733,975 B1 * | 8/2023 | Davis | G06F 8/72 |
| | | | 717/106 |

FOREIGN PATENT DOCUMENTS

| CN | 114185696 A | * | 3/2022 | |
| JP | 2023138909 A | * | 10/2023 | G06F 21/31 |
| WO | WO-2023142943 A1 | * | 8/2023 | G06F 3/04817 |

* cited by examiner

*Primary Examiner* — Phillip H Nguyen
(74) *Attorney, Agent, or Firm* — Amin, Turocy & Watson, LLP (57) ABSTRACT

The technology described herein is directed towards combining multiple sidecar (e.g., Envoy-based) proxies into a single sidecar or reduced number of sidecars for use in association with a service. Described is identifying sidecars for merging, grouping by version compatibility, and determining their functions and configuration data. Any conflicts in the configuration data are resolved. A merged sidecar is built by combining functional code and configuration data. The merged sidecar is deployed along with its relevant service, e.g., deployed as a container in a Kubernetes environment. The merging facilitates reduction of resource utilization by having only a merged sidecar, instead of multiple sidecars, support a service.

20 Claims, 11 Drawing Sheets

CLOUD PROXY-BASED SIDECAR COALESCENCE

BACKGROUND

Envoy is a high-performance, open-source proxy designed for cloud-native applications. One of envoy's primary use cases is as a sidecar proxy, where a sidecar is a proxy process or service deployed alongside a microservice or other workload to provide some functionality.

As some non-limiting examples, sidecars are used for service discovery and load balancing for microservices, and can also provide automatic failover and circuit breaking for increased resiliency. Sidecar proxies can provide security and compliance features, such as authentication, authorization, encryption, and audit logging. Sidecar proxies can provide advanced traffic management capabilities, such as rate limiting, retry logic, and protocol translation. Sidecar proxies further can provide observability features, such as tracing, metrics, and logging. Sidecar proxies also support polyglot programming, in which different microservices are written in different programming languages, by providing a common communication protocol between them. A typical flow with sidecar proxies can involve multiple numbers of envoy-based sidecar proxies.

Sidecar proxies have some drawbacks, including that they add a layer of complexity to microservices-based applications, which can make them harder to manage and troubleshoot; operators have to monitor and manage not only the microservices themselves, but also the sidecar proxies that are running alongside them. Sidecar proxies also consume additional resources, such as CPU, memory, and network bandwidth, which can increase the overall resource usage of microservices-based applications. This can be a problematic for applications with large numbers of microservices or limited resource availability. Further, sidecar proxies can add additional latency to microservices-based applications, particularly if the proxies are not optimized for performance. This can be a concern for latency-sensitive applications or applications with strict performance requirements.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards combining multiple (e.g., Envoy-based) sidecars into a lesser number of sidecars, e.g., a single sidecar. This can provide several benefits, including simplification, performance, security, flexibility, and cost savings. In particular, the technology described herein reduces the resource usage relative to a multiple sidecar deployment.

To this end, described herein is a system that identifies sidecars that are to be used in a deployment to support a service, and determine the sidecars' functions, configurations and version (e.g., envoy version) compatibility. After grouping by version compatibility, the system can typically build a single sidecar by combining functionality code and configuration data, e.g., each sidecar's functional code that is not related to base envoy. The single sidecar is deployed, e.g., to a Kubernetes® (K8S) container, for use alongside its relevant service.

It should be understood that any of the examples herein are non-limiting. As one example, the technology is described in an Envoy and Kubernetes® environment, however this is only an example and can be implemented in similar environments, including those not yet implemented. It also should be noted that terms used herein, such as "optimization," "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/ implementation is included in at least one embodiment/ implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
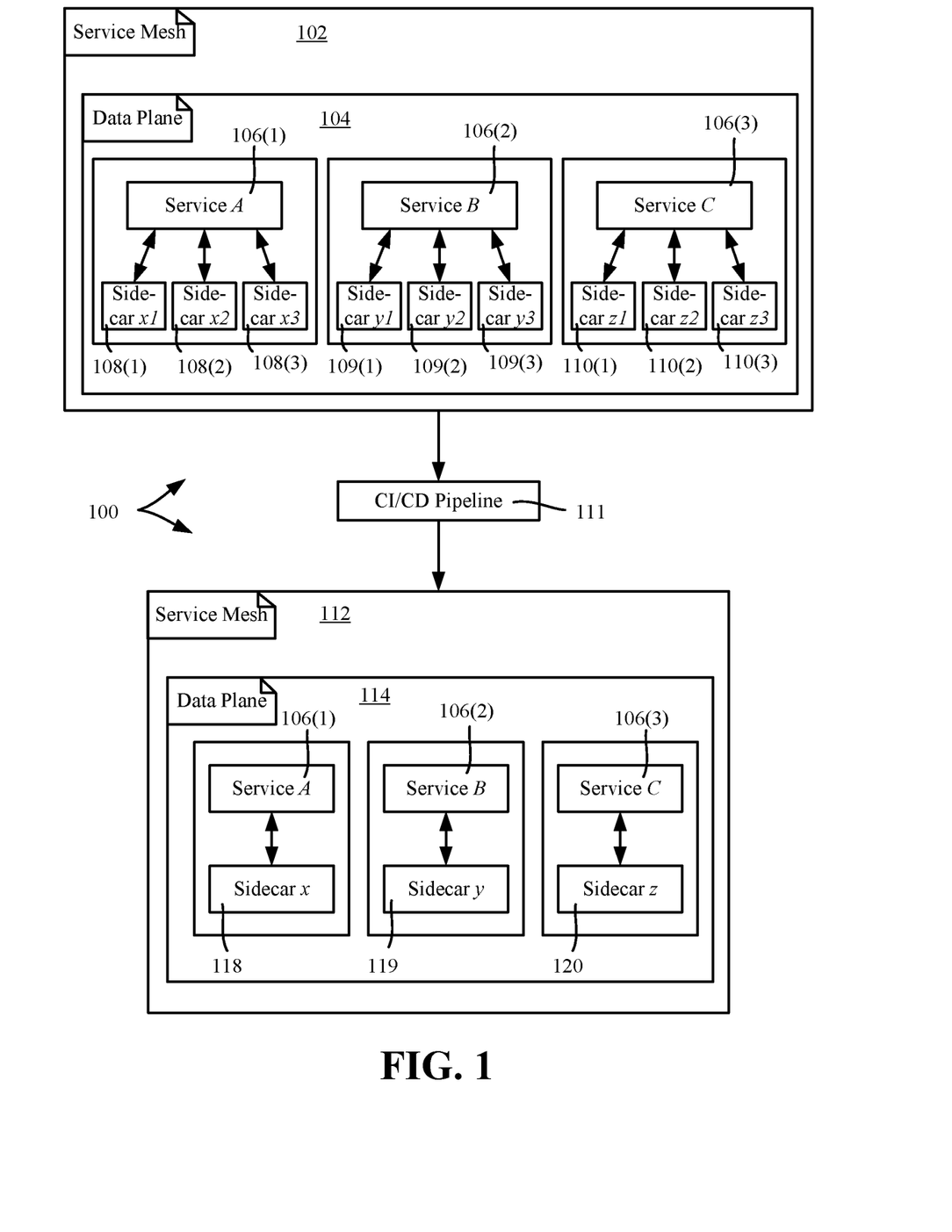
FIG. 1 depicts an example block diagram representation of an example system/architecture including the merging and deployment of sidecars after processing pre-merged sidecars through a continuous integration and continuous deployment configuration (CI/CD) pipeline, in accordance with various aspects and implementations of the subject disclosure.

FIG. 1 is an example representation of a system/architecture 100 in which an instance of a service mesh 102 includes an instance of a data plane 104 in which a number of services and supporting sidecars are configured to run. In this example, the services include service A 106(1), service B 106(2) and service C 106(3). Each of the services is shown as having three supporting sidecars, namely the service A 106(1) has three supporting sidecars x1 108(1), x2 108(2) and x3 108(3), the service B 106(2) has three supporting sidecars y1 109(1), y2 109(2) and y3 109(3), and the service C 106(3) has three supporting sidecars z1 110(1), z2 119(2) and z3 110(3).

Described herein is aggregating the corresponding sidecar code and configuration data (e.g., of compatible envoy versions) and triggering deployment for changes to take effect. In FIG. 1, a continuous integration and continuous deployment configuration (CI/CD) pipeline 111 performs the sidecar aggregation based on the technology described herein. In the example of FIG. 1, after aggregation in to coalesced sidecars, a later instance of a service mesh 122 includes a later instance of a data plane 114 in which the services remain unchanged, and thus again include service A 106(1), service B 106(2) and service C 106(3). However, as seen in this later data place instance 114, each of the services now needs only one supporting sidecar, (each sidecar coalesced from the previous corresponding three), such that the service A 106(1) has one supporting sidecar x 118, the service B 106(2) has one supporting sidecar y 119, and the service C 106(3) has one supporting sidecar z 120.

Figure 2:
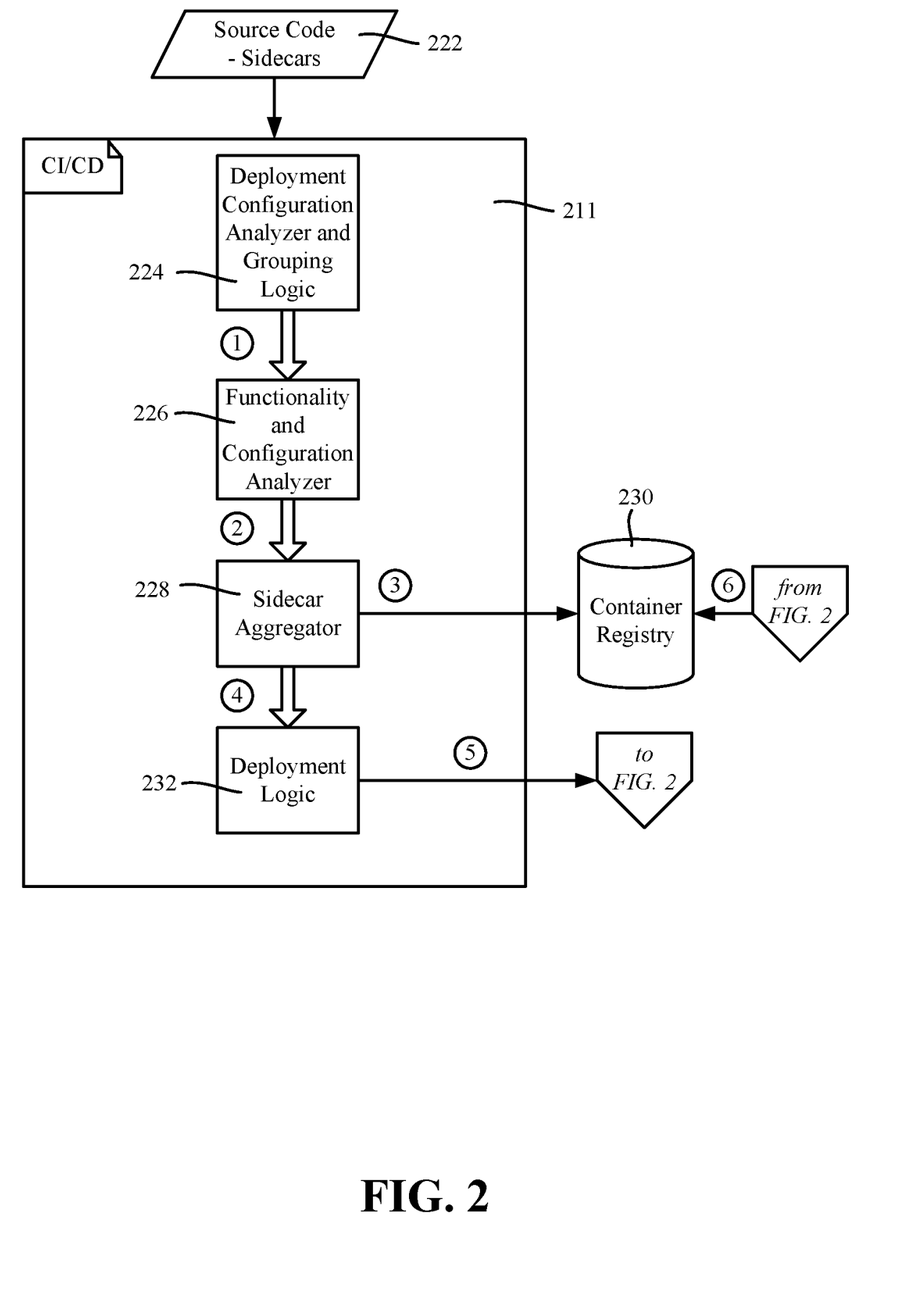
FIGS. 2 and 3 comprise an example block diagram representation of components and operations related to merging and deploying sidecars, in accordance with various aspects and implementations of the subject disclosure.
Figure 3:
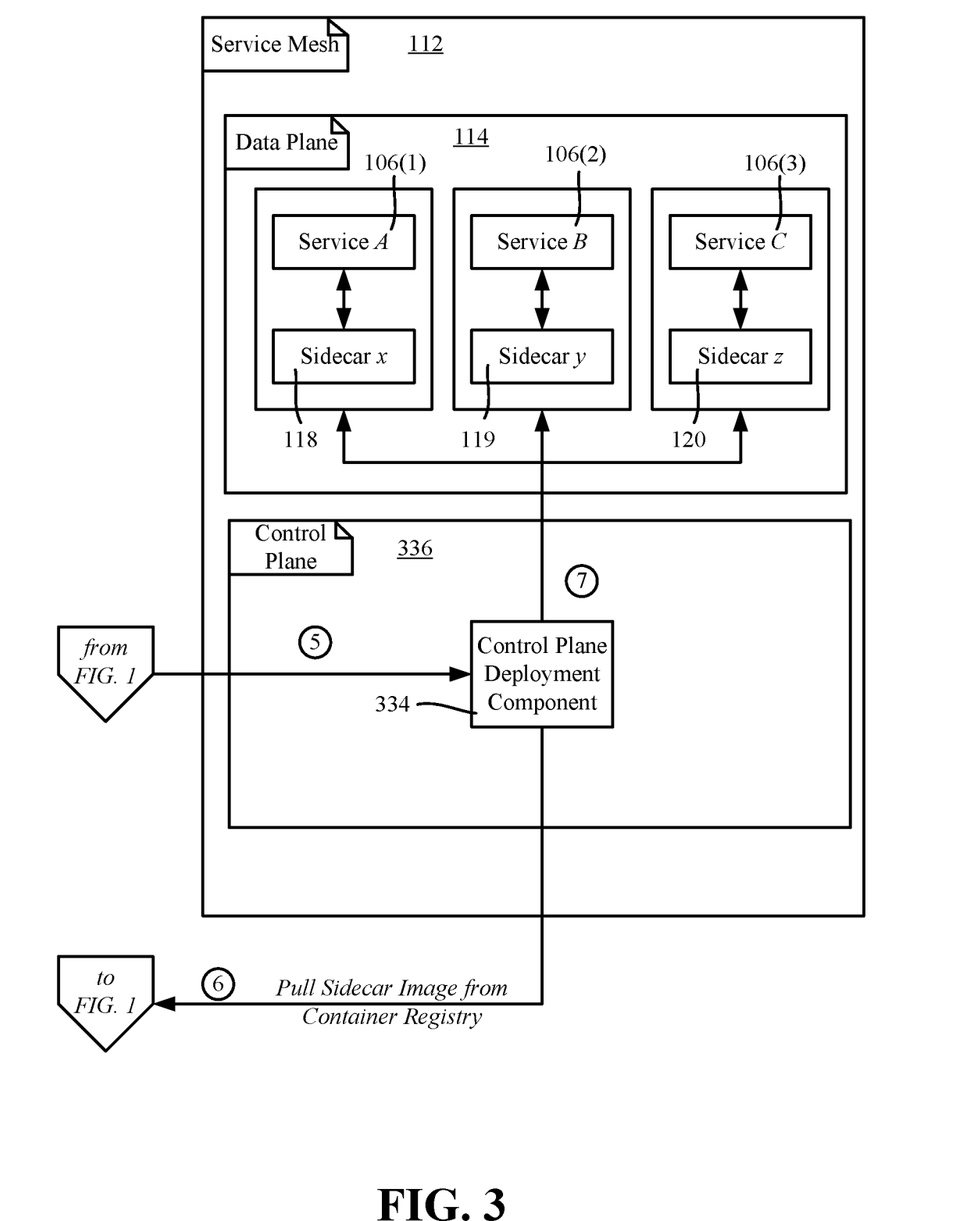

FIGS. 2 and 3 show additional details of a CI/CD pipeline 211 in which source code 222 of multiple sidecars is to be coalesced into a lesser number of sidecars, e.g., a single sidecar per service as shown in the post-aggregation service mesh instance 112 of FIG. 1. A first component shown in the CI/CD pipeline 211 is deployment configuration analyzer and grouping logic 224, which begins by performing static analysis of a service deployment (e.g., yet another markup language (yaml)-formatted) file corresponding to part of the source code 222 to obtain information about defined sidecars.

There are a number of possible use cases, including when there are no sidecars defined, in which the overall process can proceed to service deployment. Another use case is when there are multiple sidecars defined, but from previous execution and processing a single sidecar was already defined. If the service configuration has not already updated, the system updates the service configuration with the single sidecar definitions (which is one of the functionalities provided by the sidecar aggregator 228 as described herein), and proceeds to service deployment. A third use case, corresponding to a significant part of the technology described herein, is when there are multiple sidecars defined with no previous execution, meaning that coalescing of the sidecars may be possible.

To determine whether coalescing can be performed, the deployment configuration analyzer and grouping logic 224 checks the (e.g., envoy in the example of FIGS. 2 and 3) versions of the sidecars. In one implementation, checking of the versions can be done, for example, with docker exec <container_id_or_name> envoy-version (where Docker is a container runtime supported by Kubernetes. Once checked, the deployment configuration analyzer and grouping logic 224 groups the sidecars by envoy compatibility versions. The merged, single sidecars will be created based on each of these groupings. Note however that while in most cases single sidecars will result from the grouping and merging, in scenarios where there is more than one group, the number of resulting sidecars is typically reduced significantly.

Following grouping, as represented by the arrow labeled one (1), a functionality and configuration analyzer 226 processes the code. The functionality and configuration analyzer 226 is responsible for discovering the code and configuration data (that is, the code and configuration that is not related to based envoy code and configuration) to merge into a single codebase. Merging two or more sidecars from the same envoy compatibility group includes examining the code of each individual sidecar to identify the components and functionality that need to be combined. Merging also includes identifying any conflicts or compatibility issues between the different sidecars that need to be addressed.

By way of examples, one issue is when sidecar dependency packages are not the same, which is problematic. For example, consider that sidecar S1 makes use of some library version L1, while another sidecar S2 utilizes the same library, but version L2. In such a collision situation, packages can be automatically upgraded to the latest version, or manual consolidation (e.g., to change one of the libraries) can be performed.

A further operation functionality and configuration analyzer 226 is to determine which configuration elements are to be combined and which ones, if any, conflict with each other. The detecting and resolving of conflicts are described herein with reference to examples shown in FIGS. 4-6.

Figure 4:
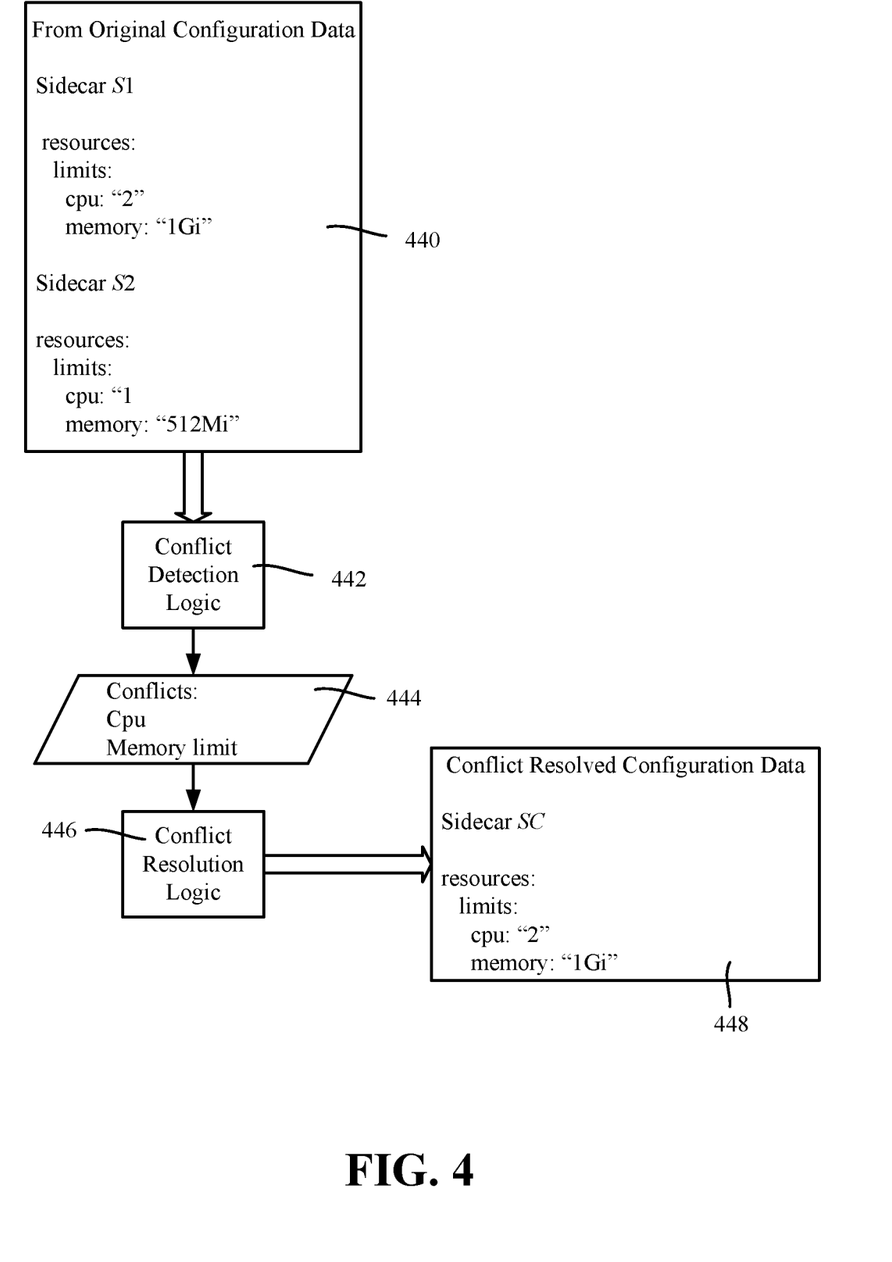
FIG. 4 depicts an example block diagram representation of resolving resource (limit) conflicts between sidecars, in accordance with various aspects and implementations of the subject disclosure.

In the example of FIG. 4, a resource allocation conflict is detected and needs to be resolved. More particularly, in this example from the original configuration data 440, (e.g., in yaml format) a sidecar S1 to be merged has resource limits of cpu ("2") and memory ("1 Gi", where Gi refers to Gibibytes, that is, 1 GiB=$1024^3$). The sidecar S2 has resource limits of cpu ("1") and memory ("512 Mi", where Mi refers to mebibytes, that is, 1 MiB=$1024^2$). Conflict detection logic 442 incorporated into (or coupled to) the functionality and configuration analyzer 226 detects the conflicts (data block 444), and conflict resolution logic 446 resolves the conflicts. For example, the conflicts are resolved to facilitate merging as represented in conflict resolved configuration data block 448 for the merged (coalesced) sidecar SC, in this example by selecting one of the two CPUs "2", and selecting the larger amount of memory 1 GiB. The conflicts can be resolved based on predefined CI/CD configuration data, such as by automatically choosing the larger memory limit, and the more powerful CPU (if there is any difference other than the number). A conflict can be flagged for manual resolution; e.g., if the CI/CD configuration data does not have information on the CPUs, the conflict resolution logic can notify an operator to examine any unresolved conflict (look into any difference between the CPUs) and make a conflict resolution selection.

Figure 5:
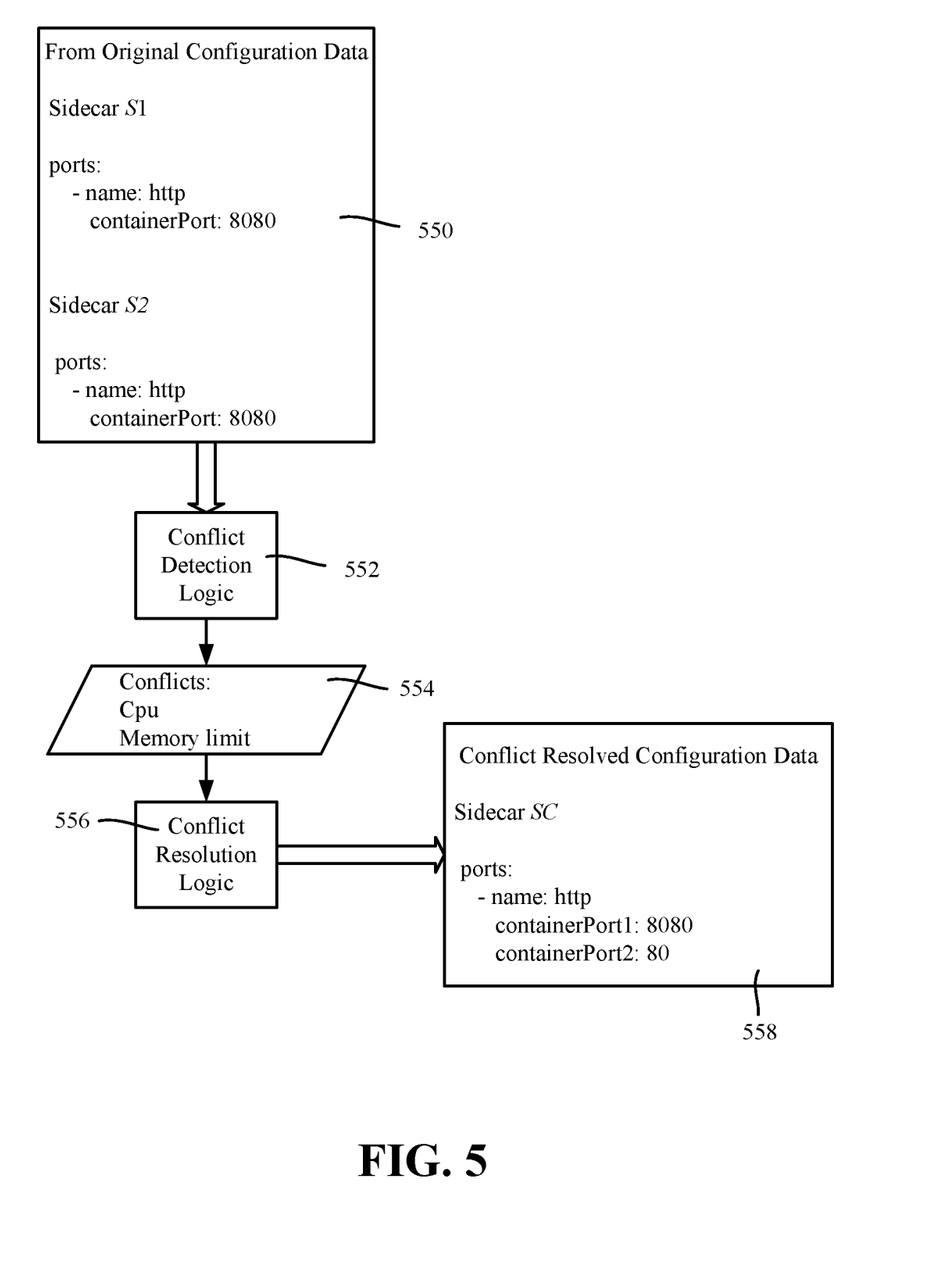
FIG. 5 depicts an example block diagram representation of resolving port conflicts between sidecars, in accordance with various aspects and implementations of the subject disclosure.

FIG. 5 shows another example, namely a port conflict in which the same http port is used for both sidecars S1 and S2 as shown in the yaml text from the original configuration data 550. As can be seen, if the same port cannot be used by the merged sidecar and a second port is needed to resolve the conflict, two ports can be defined, e.g., container port1: 8080 and container port2: 80 in the conflict resolved configuration data block 558.

Figure 6:
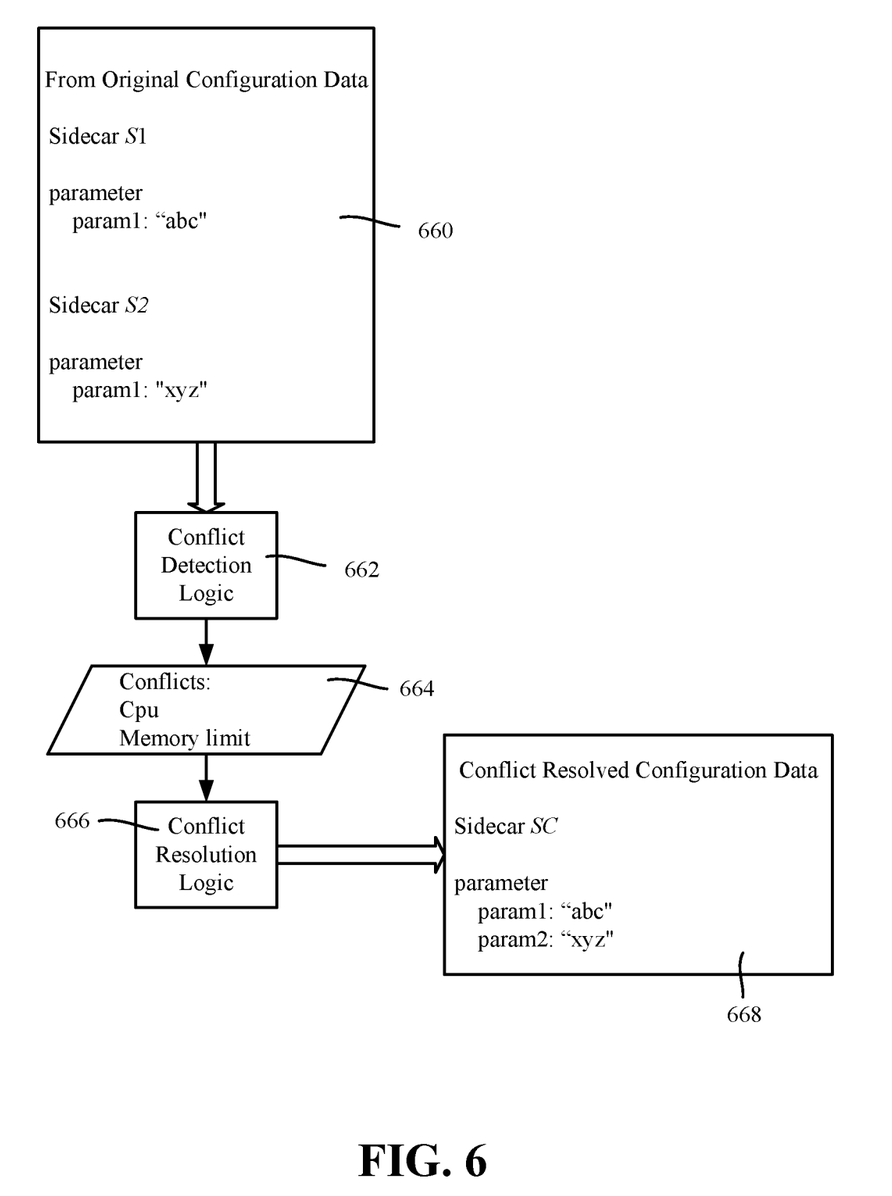
FIG. 6 depicts an example block diagram representation of resolving parameter conflicts between sidecars, in accordance with various aspects and implementations of the subject disclosure.

In the example of FIG. 6, a parameters conflict is shown in which the configuration data 660 from the yaml files has a parameter key ("param1") is the same in the sidecar S1 and S2, but the values are different, namely "abc" and "xyz", respectively. As with FIG. 5, if the same parameter value cannot be used by the merged sidecar, a second parameter parma2 is defined to resolve the conflict.

Returning to FIG. 2, once the functionality and configuration analyzer 226 determines which configuration elements are to be combined, and any conflicts have been resolved, the process continues as represented by the arrow labeled two (2) to a sidecar aggregator 228. The sidecar aggregator 228 performs the aggregation on the results from the functionality and configuration analyzer 226. To this end, the sidecar aggregator 228 combines the relevant code and components from each individual sidecar into a new, unified codebase. The sidecar aggregator 228 also combines the relevant configuration elements from each individual configuration file into a single file. Note that the sidecar aggregator 228 can invoke a suitable tool (from among a number of well-known tools) that can merge multiple configuration (e.g., yaml) files into a single file; (such well-known tools are not described herein).

Once merged, the sidecar aggregator 228 updates the original service deployment configuration with the new, single sidecar in this example, instead of the multiple sidecars that existed previously. The sidecar aggregator 228 pushes the created sidecar (an image of the single sidecar) into a container registry 232, which serves as a repository for sidecars. This is represented in FIG. 2 via the arrow labeled three (3). Note that although not shown, it is understood that some testing of the merged sidecar can be performed before updating the service deployment configuration and storing the sidecar in the container registry 232.

As represented in FIG. 2 by the labeled arrow four (4), after the original service deployment configuration has been updated and the merged sidecar is accessible via the container registry 230, deployment logic 232 (a deployer component) is responsible to deploy the service and the sidecar container, e.g., into a Kubernetes (K8S) environment. To this end, as shown in FIGS. 2 and 3 via the labeled arrow five (5), the deployment logic 232 triggers a control plane deployment component 334 (FIG. 3) of a control plane 336 of the service mesh 112 (corresponding to FIG. 1). The control plane deployment component 334 pulls the sidecar image (and its associated service if not already obtained) from the container registry 230, as represented in FIGS. 2 and 3 via the labeled arrow six (6). As result, there is now a workload (e.g., the service A 106(1) with a single sidecar x 118 (instead of multiple sidecars as in the data plane 104 of FIG. 1). As can be readily appreciated, similar merging and deployment can be performed to generate and deploy the merged sidecar y 119 for the service B 106(2) and the merged sidecar z 120 for the service C 106(3).

Figure 7:
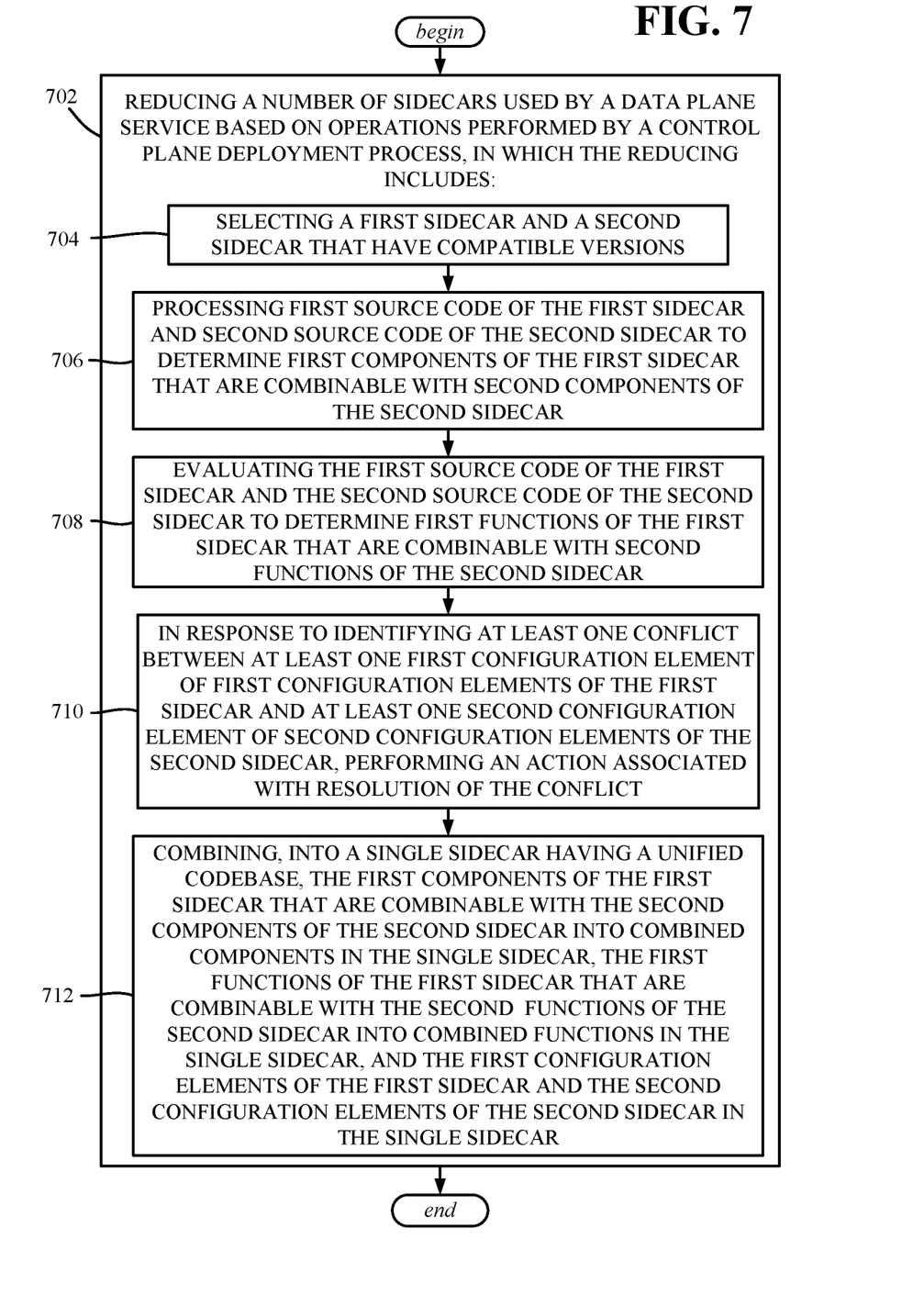
FIG. 7 is a flow diagram showing example operations related combining components of a first sidecar that are combinable with components of a second sidecar into a combined sidecar, in accordance with various aspects and implementations of the subject disclosure.

One or more aspects can be embodied in a system, such as represented in the example operations of FIG. 7, and for example can include a memory that stores computer executable components and/or operations, and a processor that executes computer executable components and/or operations stored in the memory. Example operations can include operation 702, which represents reducing a number of sidecars used by a data plane service based on operations performed by a control plane deployment process, in which the reducing can include operations 704-712. Example operation 704 represents selecting a first sidecar and a second sidecar that have compatible versions. Example operation 706 represents processing first source code of the first sidecar and second source code of the second sidecar to determine first components of the first sidecar that are combinable with second components of the second sidecar. Example operation 708 represents evaluating the first source code of the first sidecar and the second source code of the second sidecar to determine first functions of the first sidecar that are combinable with second functions of the second sidecar. Example operation 710 represents in response to identifying at least one conflict between at least one first configuration element of first configuration elements of the first sidecar and at least one second configuration element of second configuration elements of the second sidecar, performing an action associated with resolution of the conflict. Example operation 712 represents combining, into a single sidecar having a unified codebase, the first components of the first sidecar that are combinable with the second components of the second sidecar into combined components in the single sidecar, the first functions of the first sidecar that are combinable with the second functions of the second sidecar into combined functions in the single sidecar, and the first configuration elements of the first sidecar and the second configuration elements of the second sidecar in the single sidecar.

The first sidecar and the second sidecar can include envoy proxies. Evaluating the first source code of the first sidecar to determine the first components of the first sidecar can include evaluating a subset of the first source code that is not related to an envoy codebase. Further operations can include identifying the first configuration elements of the first sidecar; identifying the first configuration elements of the first sidecar can include evaluating a subset of the first configuration elements that are not related to envoy codebase configuration elements.

Combining into the single sidecar can include merging a first configuration file corresponding to the first sidecar and a second configuration file corresponding to the second sidecar into a single configuration file. Merging the first configuration file corresponding to the first sidecar and the second configuration file corresponding to the second sidecar can include invoking a merging tool that merges multiple configuration files. Merging the first configuration file corresponding to the first sidecar and the second configuration file corresponding to the second sidecar can include yet another markup language (YAML) formatted files.

Further operations can include updating a first service deployment configuration comprising the first sidecar and the second sidecar to a second deployment configuration comprising the single sidecar.

The sidecar can correspond to a container, and further operations can include maintaining the single sidecar as a container in a container depository. The container can include a Kubernetes container, and further operations can include deploying a workload in association with deploying the container in a Kubernetes environment.

Further operations can include grouping the first sidecar and the second sidecar based on version compatibility.

Identifying the at least one conflict can include identifying at least one of: at least one conflicting resource allocation, at least one conflicting port assignment, or at least one conflicting parameter that has a common key with another parameter.

Resolving the conflicts can include accessing a predefined continuous integration and continuous deployment configuration pipeline.

Figure 8:
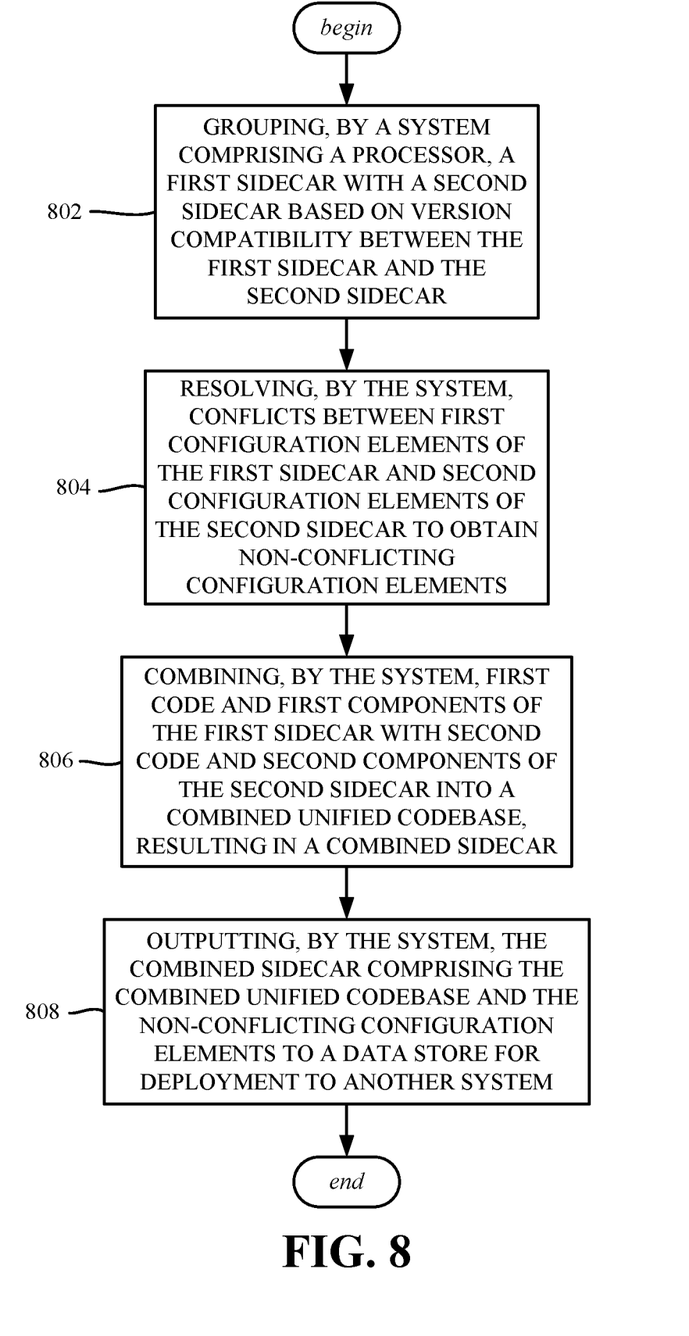
FIG. 8 is a flow diagram showing example operations related to combining first code and first components of a first sidecar with second code and second components of a second sidecar into a combined unified codebase, and outputting a resultant combined sidecar, in accordance with various aspects and implementations of the subject disclosure.

One or more example aspects, such as corresponding to example operations of a method, are represented in FIG. 8. Example operation 802 represents grouping, by a system comprising a processor, a first sidecar with a second sidecar based on version compatibility between the first sidecar and the second sidecar. Example operation 804 represents resolving, by the system, conflicts between first configuration elements of the first sidecar and second configuration elements of the second sidecar to obtain non-conflicting configuration elements. Example operation 806 represents combining, by the system, first code and first components of the first sidecar with second code and second components of the second sidecar into a combined unified codebase, resulting in a combined sidecar. Example operation 808 represents outputting, by the system, the combined sidecar comprising the combined unified codebase and the non-conflicting configuration elements to a data store for deployment to another system.

Further operations can include maintaining, by the system, the resultant combined sidecar as a container in a container repository for deployment in place of deployment instances of the first sidecar and the second sidecar.

Resolving the conflicts can include resolving at least one of: conflicting resource allocations, conflicting port assignments, or conflicting parameters that have a common key.

Combining the first code and first components of the first sidecar with second code and second components of the second sidecar into a combined unified codebase can include merging a first configuration file corresponding to the first sidecar and a second configuration file corresponding to the second sidecar into a single configuration file.

Figure 9:
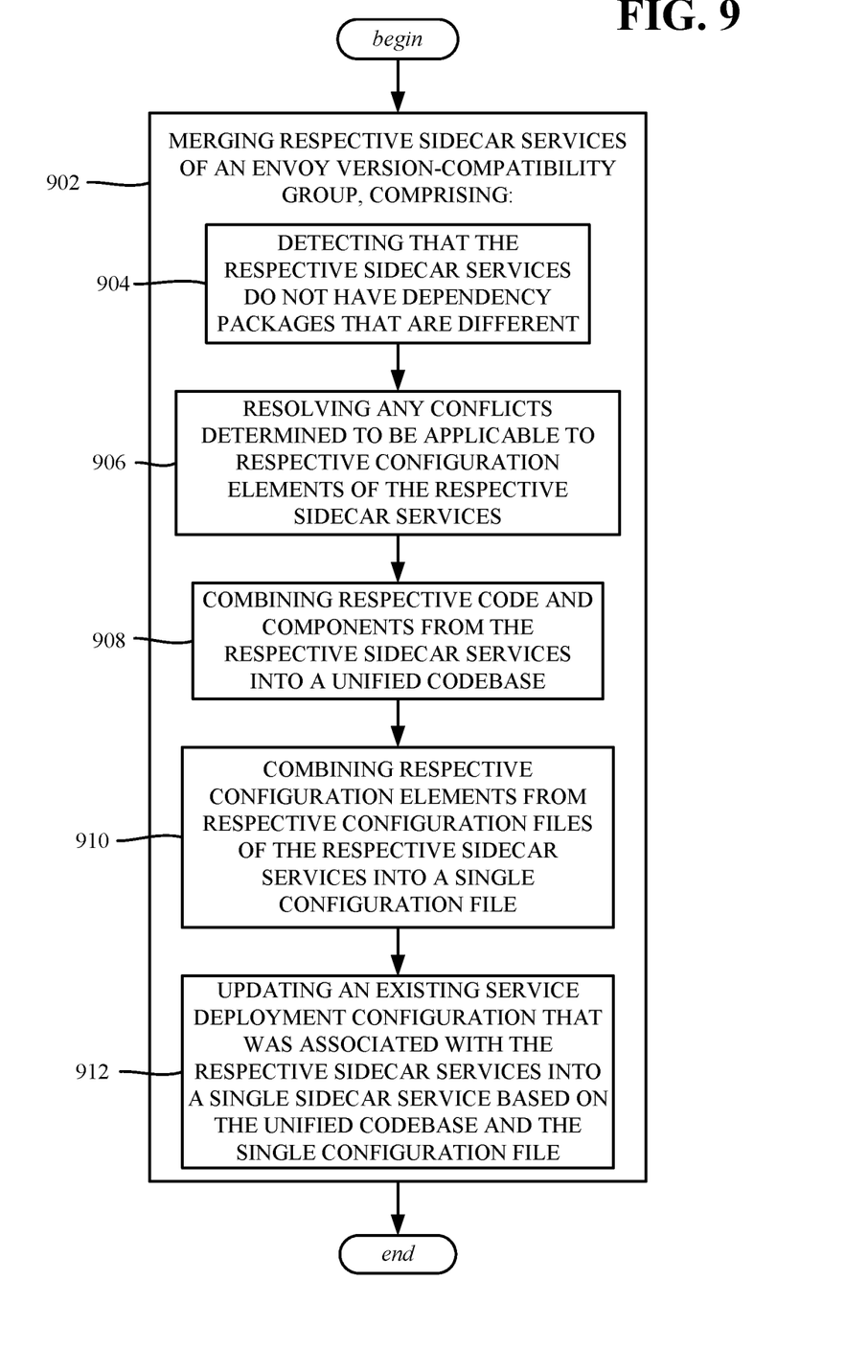
FIG. 9 is a flow diagram showing example operations related to merging respective sidecar services of an envoy version-compatibility group, and updating an existing service deployment configuration with the single sidecar service, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents merging respective sidecar services of an envoy version-compatibility group, which can include operations 904-912. Example operation 904 represents detecting that the respective sidecar services do not have dependency packages that are different. Example operation 906 represents resolving any conflicts determined to be applicable to respective configuration elements of the respective sidecar services. Example operation 908 represents combining respective code and components from the respective sidecar services into a unified codebase. Example operation 910 represents combining respective configuration elements from respective configuration files of the respective sidecar services into a single configuration file. Example operation 912 represents updating an existing service deployment configuration that was associated with the respective sidecar services into a single sidecar service based on the unified codebase and the single configuration file.

Further operations can include deploying the single sidecar service as a container associated with a workload in a deployment environment.

Combining the respective configuration elements from respective configuration files of the respective sidecar services into a single configuration file can include invoking a configuration file merging tool.

As can be seen, the technology described herein facilitates reducing resource utilization by merging one or more sidecars together into a single sidecar service/container (or lesser number thereof). By analyzing deployed configurations and grouping by version compatibility, along with analyzing the functionality and configuration data of grouped sidecars, a single sidecar can be created via aggregation to upload for deployment. Once, e.g., as a container. The technology described herein is thus highly beneficial in edge-based computing environments as well as cloud systems.

Figure 10:
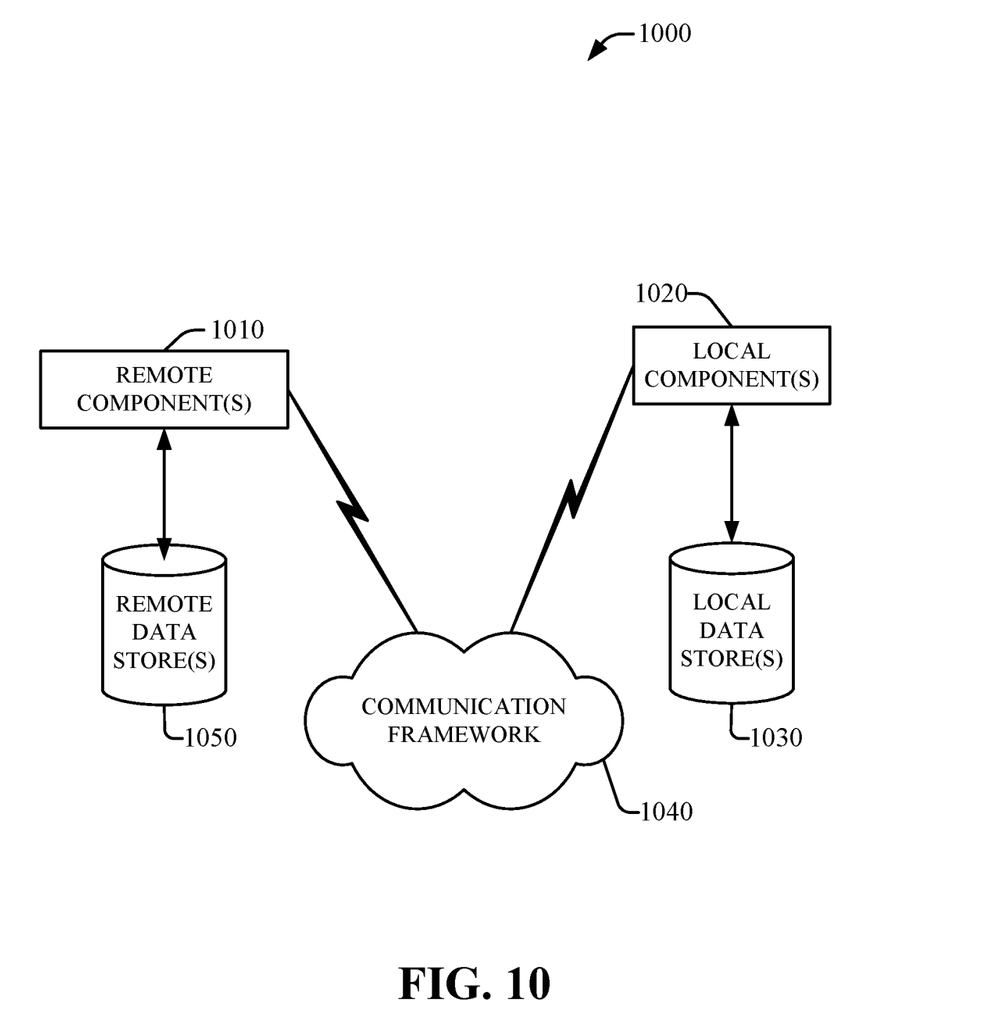
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
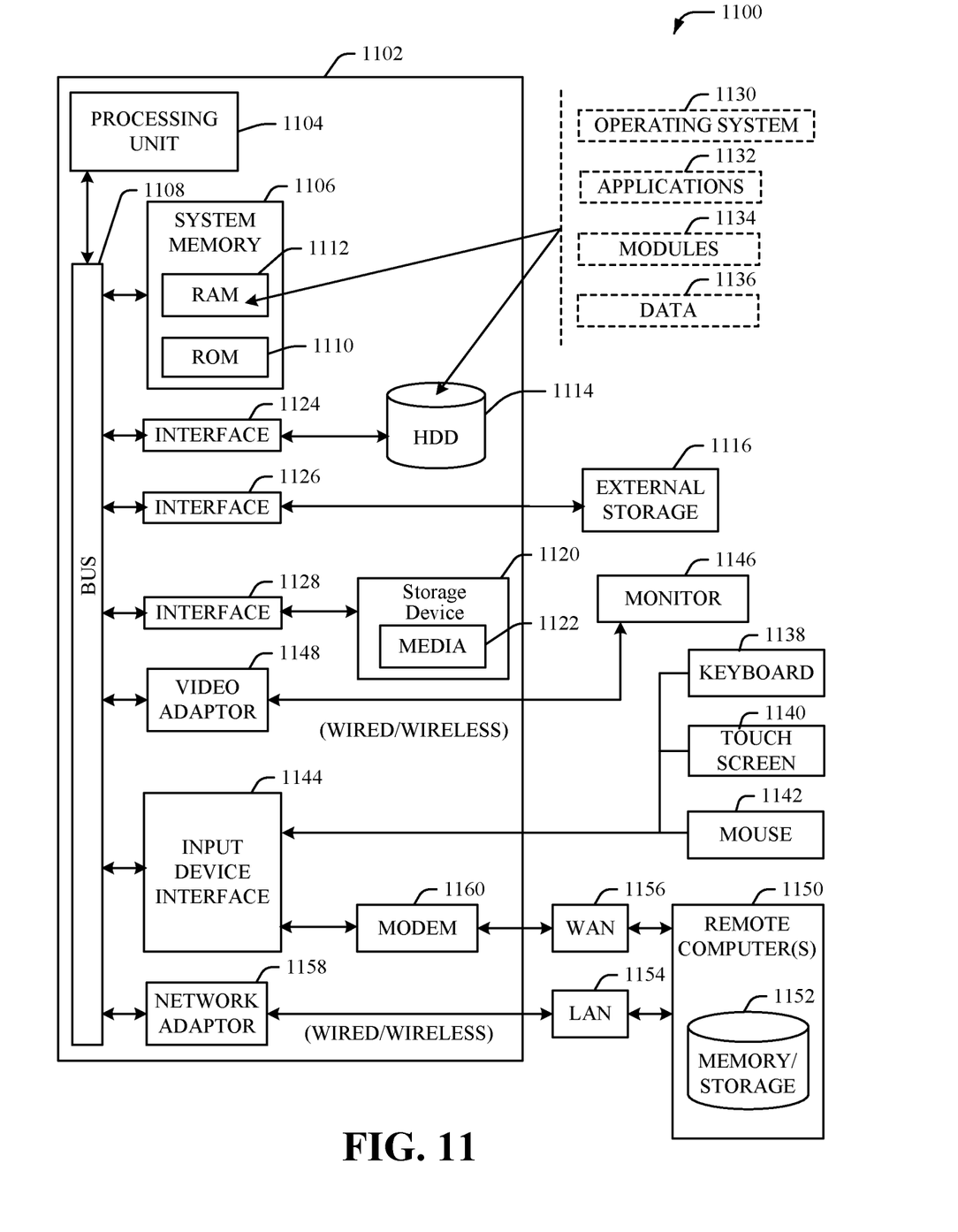
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
reducing a number of sidecars used by a data plane service based on operations performed by a control plane deployment process, the reducing comprising:
selecting a first sidecar and a second sidecar that have compatible versions;
processing first source code of the first sidecar and second source code of the second sidecar to determine first components of the first sidecar that are combinable with second components of the second sidecar;
evaluating the first source code of the first sidecar and the second source code of the second sidecar to determine first functions of the first sidecar that are combinable with second functions of the second sidecar;
in response to identifying at least one conflict between at least one first configuration element of first configuration elements of the first sidecar and at least one second configuration element of second configuration elements of the second sidecar, performing an action associated with resolution of the conflict; and
combining, into a single sidecar having a unified codebase, the first components of the first sidecar that are combinable with the second components of the second sidecar into combined components in the single sidecar, the first functions of the first sidecar that are combinable with the second functions of the second sidecar into combined functions in the single sidecar, and the first configuration elements of the first sidecar and the second configuration elements of the second sidecar in the single sidecar.

2. The system of claim 1, wherein the first sidecar and the second sidecar comprise envoy proxies.

3. The system of claim 2, wherein the evaluating of the first source code of the first sidecar to determine the first components of the first sidecar comprises evaluating a subset of the first source code that is not related to an envoy codebase.

4. The system of claim 2, wherein the operations further comprise:
identifying the first configuration elements of the first sidecar, and wherein the identifying of the first configuration elements of the first sidecar comprises evaluating a subset of the first configuration elements that are not related to envoy codebase configuration elements.

5. The system of claim 1, wherein the combining into the single sidecar comprises merging a first configuration file corresponding to the first sidecar and a second configuration file corresponding to the second sidecar into a single configuration file.

6. The system of claim 5, wherein the merging of the first configuration file corresponding to the first sidecar and the second configuration file corresponding to the second sidecar comprises invoking a merging tool that merges multiple configuration files.

7. The system of claim 5, wherein the merging of the first configuration file corresponding to the first sidecar and the second configuration file corresponding to the second sidecar comprise yet another markup language (YAML) formatted files.

8. The system of claim 1, wherein the operations further comprise updating a first service deployment configuration comprising the first sidecar and the second sidecar to a second deployment configuration comprising the single sidecar.

9. The system of claim 8, wherein the sidecar corresponds to a container, and wherein the operations further comprise maintaining the single sidecar as a container in a container depository.

10. The system of claim 9, wherein the container comprises a Kubernetes container, and wherein the operations further comprise deploying a workload in association with deploying the container in a Kubernetes environment.

11. The system of claim 1, wherein the operations further comprise grouping the first sidecar and the second sidecar based on version compatibility.

12. The system of claim 1, wherein the identifying of the at least one conflict comprises identifying at least one of: at least one conflicting resource allocation, at least one conflicting port assignment, or at least one conflicting parameter that has a common key with another parameter.

13. The system of claim 1, wherein the resolving of the conflicts comprises accessing a predefined continuous integration and continuous deployment configuration pipeline.

14. A method, comprising:
grouping, by a system comprising a processor, a first sidecar with a second sidecar based on version compatibility between the first sidecar and the second sidecar;
resolving, by the system, conflicts between first configuration elements of the first sidecar and second configuration elements of the second sidecar to obtain non-conflicting configuration elements;
combining, by the system, first code and first components of the first sidecar with second code and second components of the second sidecar into a combined unified codebase, resulting in a combined sidecar; and
outputting, by the system, the combined sidecar comprising the combined unified codebase and the non-conflicting configuration elements to a data store for deployment to another system.

15. The method of claim 14, further comprising maintaining, by the system, the resultant combined sidecar as a container in a container repository for deployment in place of deployment instances of the first sidecar and the second sidecar.

16. The method of claim 14, wherein the resolving of the conflicts comprises resolving at least one of: conflicting resource allocations, conflicting port assignments, or conflicting parameters that have a common key.

17. The method of claim 14, wherein the combining of the first code and first components of the first sidecar with second code and second components of the second sidecar into a combined unified codebase comprises merging a first configuration file corresponding to the first sidecar and a second configuration file corresponding to the second sidecar into a single configuration file.

18. A non-transitory machine-readable medium, comprising executable instructions that, when executed by a processor of a user equipment, facilitate performance of operations, the operations comprising:
merging respective sidecar services of an envoy version-compatibility group, comprising:
detecting that the respective sidecar services do not have dependency packages that are different;
resolving any conflicts determined to be applicable to respective configuration elements of the respective sidecar services;
combining respective code and components from the respective sidecar services into a unified codebase;
combining respective configuration elements from respective configuration files of the respective sidecar services into a single configuration file; and
updating an existing service deployment configuration that was associated with the respective sidecar services into a single sidecar service based on the unified codebase and the single configuration file.

19. The non-transitory machine-readable medium of claim 18, wherein the operations further comprise deploying the single sidecar service as a container associated with a workload in a deployment environment.

20. The non-transitory machine-readable medium of claim 18, wherein the combining of the respective configuration elements from respective configuration files of the respective sidecar services into a single configuration file comprises invoking a configuration file merging tool.

* * * * *